United States Patent [19]

Fujiwara et al.

[11] Patent Number: 4,692,422
[45] Date of Patent: Sep. 8, 1987

[54] HIGH DIELECTRIC PORCELAIN COMPOSITION AND METHOD OF REDUCING SINTERING TEMPERATURE THEREOF

[75] Inventors: Shinobu Fujiwara; Atsushi Satoh; Tetsuya Hattori; Junichi Sutoh, all of Tokyo, Japan

[73] Assignee: TDK Corporation, Japan

[21] Appl. No.: 858,945

[22] Filed: May 2, 1986

[30] Foreign Application Priority Data

May 2, 1985 [JP] Japan ................................. 60-93741

[51] Int. Cl.$^4$ ............................................. C04B 35/46
[52] U.S. Cl. .................................... 501/136; 501/135; 501/134
[58] Field of Search ...................... 501/134, 135, 136

[56] References Cited

U.S. PATENT DOCUMENTS 4,265,668  5/1981  Fujiwara et al. ................. 106/73.3
4,339,544  7/1982  Sakabe et al. ..................... 501/136
4,482,935  11/1984 Wheeler ............................ 501/136
4,530,031  7/1985  Donohue .......................... 501/137

FOREIGN PATENT DOCUMENTS 55-51761  4/1980  Japan ................................. 501/136
55-51760  4/1980  Japan .

Primary Examiner—William R. Dixon, Jr.
Assistant Examiner—A. Knab
Attorney, Agent, or Firm—Steinberg & Raskin

[57] ABSTRACT

A high dielectric porcelain composition having, as a main component, a $Pb(Mg_{\frac{1}{3}}, Nb_{\frac{2}{3}})O_3$-$PbTiO_3$-$Pb(Mn_{\frac{1}{3}}, Nb_{\frac{2}{3}})O_3$ system including 95 mol. % of $Pb(Mg_{\frac{1}{3}}, Nb_{\frac{2}{3}})O_3$, 5 mol. % of $PbTiO_3$ and 0.5 weight % of $Pb(Mn_{\frac{1}{3}}, Nb_{\frac{2}{3}})O_3$, and, in addition, a sub-component including PbO and ZnO. Such a dielectric porcelain is capable of being sintered at a temperature lower than 1000° C. A method of reducing the sintering temperature of such a high dielectric porcelain composition, is also provided.

10 Claims, 2 Drawing Figures

HIGH DIELECTRIC PORCELAIN COMPOSITION AND METHOD OF REDUCING SINTERING TEMPERATURE THEREOF

BACKGROUND OF THE INVENTION

The present invention relates to a porcelain composition of a Pb(Mg $\frac{1}{3}$, Nb $\frac{2}{3}$)O$_3$, - PbTiO$_3$ - Pb(Mn $\frac{1}{3}$, Nb $\frac{2}{3}$)O$_3$ system having a high dielectric constant and being used as a laminated porcelain condenser or the like. The present invention is also directed to a method of reducing the sintering temperature of such a high dielectric porcelain composition.

Conventional porcelain dielectrics of a Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system had excellent electrical properties, having relatively high dielectric constants $\epsilon_s$, extremely small dielectric loss tan $\delta$, and large insulating resistance IR. However these porcelain dielectrics required a range of temperatures greater than 1150° C. for the sintering thereof.

Accordingly, a large amount of heat energy was required for the sintering process. Furthermore, there was a tremendous deterioration and loss of material forming the sintering or burning furnace at high temperatures, thereby causing the maintenance cost of the burning unit to be high.

In addition, it is necessary in the case of laminated porcelain condensers, for the porcelain dielectrics to be sintered with the internal electrodes embedded therein, Ag - Pd alloy being generally used as the internal electrodes. As the temperature under which the dielectrics are sintered increases, the amount of Pd must also be increased. Accordingly, the Ag - Pd alloy which is used for the internal electrodes becomes expensive, making the cost of production high.

SUMMARY OF THE INVENTION

Accordingly, it an object of the present invention to provide a porcelain dielectric which can be sintered at a temperature of 1000° C. or lower.

It is also an object of the present invention to lower production costs when the porcelain dielectric is used, for example, as a laminated porcelain condenser, by allowing the use of inexpensive materials of lower melting points, such as silver, nickel, aluminum or the like, as the embedded internal electrodes.

These and other objects are attained by the present invention, where it has now been found that, by adding plumbous oxide (PbO) and zinc oxide (ZnO) to a composition of Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$, a procelain dielectric having a high dielectric constant and similar electrical properties to conventional porcelain dielectrics, can be obtained even when the sintering temperature is 1000° C. or lower.

Accordingly, the present invention is directed to a high dielectric porcelain composition of a Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system having about 95 mol. % of Pb(Mg $\frac{1}{3}$, Nb $\frac{2}{3}$)O$_3$, about 5 mol. % of PbTiO$_3$, about 0.5 weight % of Pb(Mn $\frac{1}{3}$, Nb $\frac{2}{3}$)O$_3$, and having distributed therethrough, in addition, a sintering temperature lowering effective amount of PbO and ZnO.

The present invention is also directed to a method of reducing sintering temperature of such a high dielectric porcelain by adding thereto a sintering temperature lowering effective amount of PbO and ZnO.

The sintering temperature lowering effective amount of the PbO and ZnO is preferably about 0.25-1.25% by weight, more preferably about 0.3-1.25% by weight, and most preferably about 0.5 to 1.25% by weight, of the weight of the Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system.

The sintering temperature lowering effective amount preferably includes about 50-93 weight % of PbO and about 7-50 weight % of ZnO, more preferably about 67-90% by weight of PbO and about 10-33% by weight of ZnO, and most preferably about 80-90% by weight PbO and about 10-20% by weight of ZnO.

DESCRIPTION OF THE PREFERRED EMBODIMENTS

Embodiments of the present invention will be described below in greater detail with reference to the accompanying drawings.

Plumbous oxide (PbO), niobium oxide (Nb$_2$O$_5$), magnesium oxide (MgO), Titanium oxide (TiO$_2$) and manganese oxide (MnO) were used as starting materials. These components were wet-mixed in the mixing ratios shown in Table 1, infra, in a ball mill which is formed of synthetic resin. The resulting mixture was roast-sintered for two hours at a temperature of 700°-850° C. and subjected to chemical reaction.

The mixture was then ground in the ball mill to have a grain size of about 0.2-5.0 microns. Independent of the thus-prepared mixture, the plumbous oxide (PbO) and zinc oxide (ZnO) were mixed in mixing ratios shown in Table 1, and separately ground in the ball mill or the like to have a grain size of about 0.1-2.0 microns. This mixture of PbO and ZnO was then added to the above-prepared mixture as shown in Table 1, with the further resulting mixture then being ground in the ball mill or the like to have a grain size of about 0.2-3.0 microns.

An appropriate amount of polyvinyl alcohol was added to this finely-ground mixture, which was rendered into a defoaming slurry and then cast under a pressure of about 3 ton/cm$^2$ into a disc-like casting which had a diameter of 16.5 mm and a thickness of 0.6 mm.

In order to prevent evaporation of the lead element, the mold was sealed in a container made of magnesia porcelain and fully burned for two hours at a temperature of about 950° C. Silver electrodes were bake-attached to both end faces of the porcelain product thus obtained.

The electrical properties of the respective thus-produced samples were measured, with the results presented in Table 1 below. The dielectric constant $\epsilon_s$ and the dielectric loss tan $\delta$ were measured at a frequency of 1 KHz, while the insulating resistance IR was measured with DC voltage of 500 V. applied at a room temperature of 20° C.

As is apparent from Table 1, the porcelain compositions which were obtained as described above had a high dielectric constant $\epsilon_s$ of about 16,500–20,500, a small dielectric loss tan δ of about 0.8–1.4%, and an extremely large insulating resistance IR of $4 \times 10^{11}$ (Ω-cm). In addition, these porcelain compositions could be sintered at a low temperature of 950° C.

Figure 1:
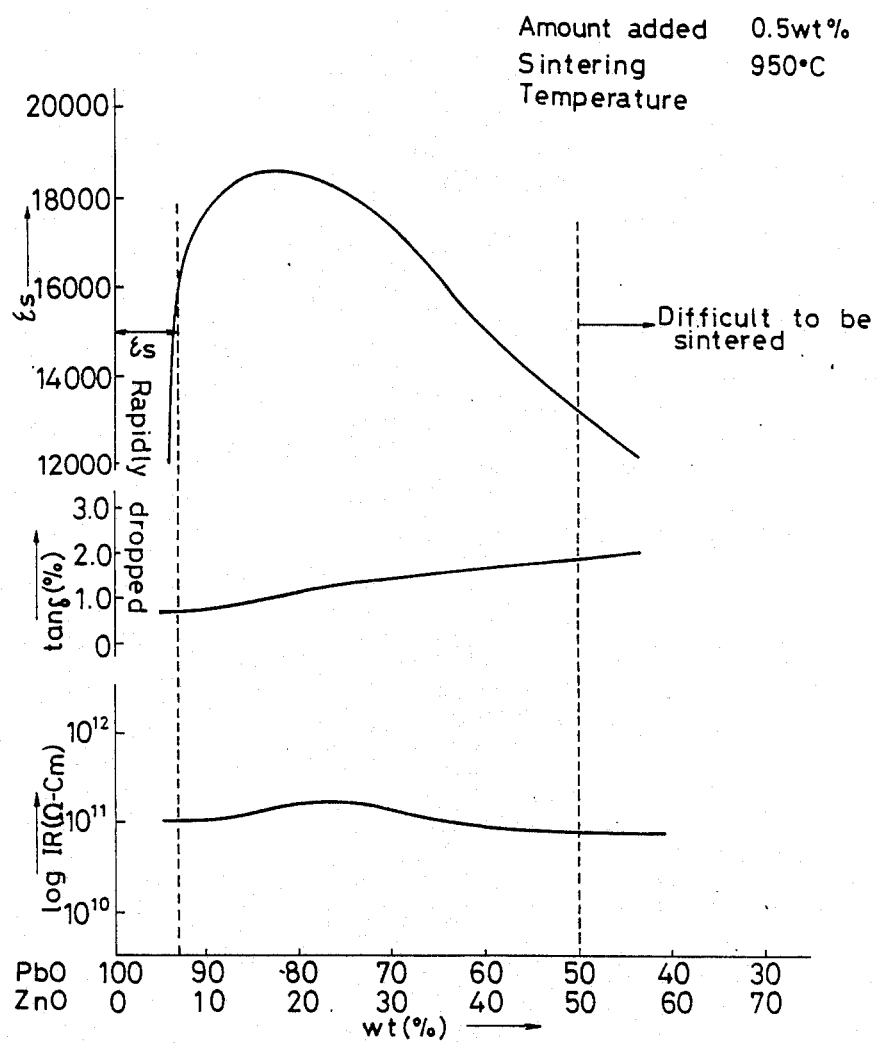
FIG. 1 illustrates relationship of electrical properties to mixing ratios in weight % of PbO and ZnO which are added to the Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system in accordance with the present invention.
Figure 2:
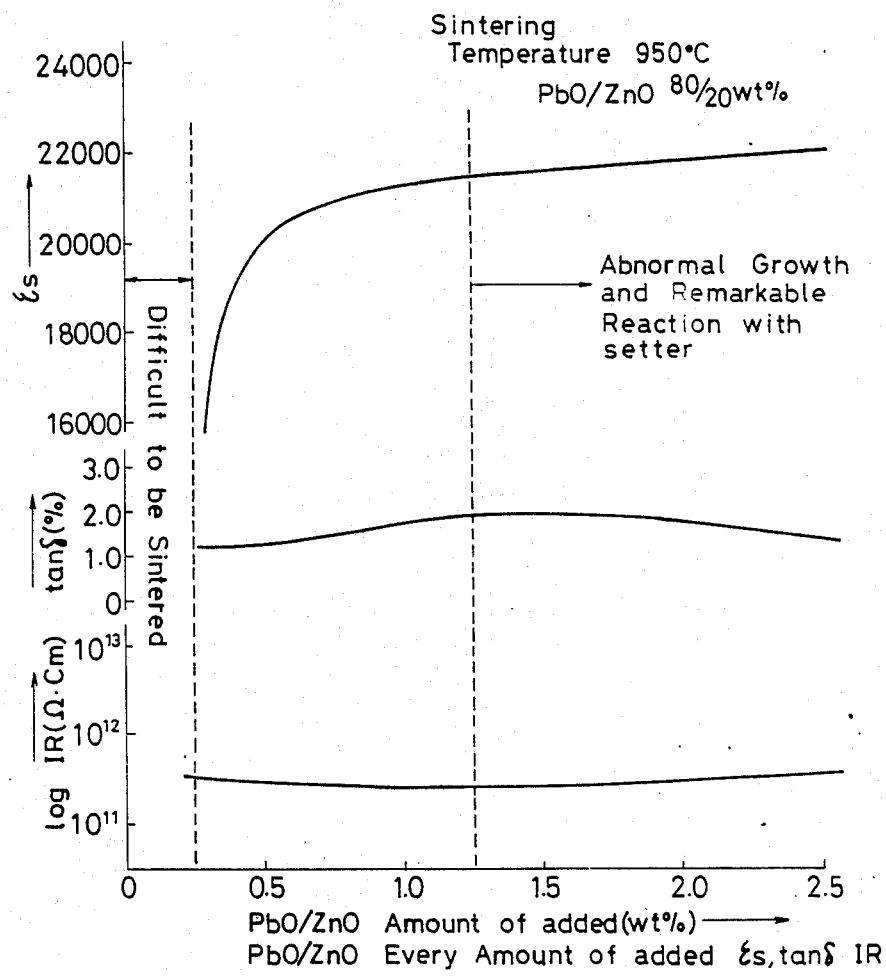
FIG. 2 illustrates the relationship of electrical properties to the sintering temperature lowering effective amount of PbO and ZnO in weight % of the weight of the Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system.

FIG. 1 has been formed by plotting the mixing ratios in weight % of the plumbous oxide (PbO) and zinc oxide (ZnO) forming a sub-component in accordance with the present invention (i.e., together forming the sintering temperature lowering effective amount) on the abscissa axis, and plotting the insulating resistances log IR, dielectric losses tan δ(%), and dielectric constants $\epsilon_s$ on the ordinate axis. FIG. 2 has been formed by plotting the amounts of PbO and ZnO in weight % (i.e., the total sintering temperature lowering effective amount) added to the main component of Pb(Mg ⅓, Nb ⅔)O₃ - PbTiO₃ - Pb(Mn ⅓, Nb ⅔)O₃ along the abscissa axis, and plotting log IR, tan δ(%) and $\epsilon_s$ on the ordinate axis.

As is apparent from FIG. 1, when PbO is not in a weight ratio range of 50–93% and ZnO is not in a range of 7–50 weight % (i.e., when PbO is less than 50 weight % and ZnO exceeds 50 weight %), then the capacity of the porcelain to be sintered is lowered, and it becomes difficult for the porcelain to be sintered at lower temperature. When PbO exceeds 93 weight % (and ZnO is less than 7 weight %), then the capacity of the porcelain to be sintered is excellent, however the dielectric constant $\epsilon_s$ rapidly drops, thereby making it impossible to obtain a porcelain composition having a high dielectric constant, which is a principal object of the present invention.

As is clear from FIG. 2, when the amount (weight %) of the PbO+ZnO sub-component added to the main component is not in a range of about 0.25 weight %–1.25 weight % (i.e., less than or equal to 0.25 weight %), then the porcelain composition is insufficiently sintered at the noted temperature (However, it has been found that the porcelain composition can be fully sintered when the sintering temperature is further raised). When the amount of the PbO+ZnO sub-component added to the main component is 1.25% by weight or greater, then the reaction of the porcelain composition is abnormally raised, and local growth of abnormal grains occurs along with reaction between the porcelain and the setter therefor. The porcelain dielectric possesses satisfactory electrical properties, however it is difficult to use as a porcelain.

Accordingly, by adding a sub-component of PbO and ZnO to a high dielectric porcelain composition having a Pb(Mg ⅓, Nb ⅔) O₃ - PbTiO₃ - Pb(Mn ⅓, Nb ⅔)O₃ system, the present invention allows the sintering temperature to be lowered to 1000° C. or less. When the thus-obtained product is used as a laminated porcelain condenser, relatively inexpensive and low-melting point materials, e.g., in the group of silver, nickel, and aluminum, can be used as the embedded internal electrodes.

As compared to conventional high dielectric porcelain compositions which could only be sintered at high temperatures, the composition of the present invention reduces the required heat energy, and also reduces the maintenance expense for materials from which the sintering furnace is constructed. This thereby makes the final product extremely advantageous to prepare, relatively inexpensively, with conservation of energy and materials as noted above.

The preceding description of the present invention is merely exemplary, and is not intended to limit the scope thereof in any way.

TABLE 1

| Specimen No. | Mixing Ratio of Main Component | | | Mixing Ratio of Sub-component | | Electric Properties | | | Sintering Temperature (°C.) | Note |
|---|---|---|---|---|---|---|---|---|---|---|
| | Pb(Mg⅓, Nb⅔)O₃ mol % | PbTiO₃ mol % | Pb(Mn⅓, Nb⅔)O₃ wt % | PbO/ZnO wt % | Amount Added wt % | Dielectric Constant $\epsilon_s$ | Dielectric Loss tan δ (%) | Insulating Resistance IR (Ω·cm) | | |
| 1 | 95.0 | 5.0 | 0.5 | 16/1 | 0.5 | 12,000 | 0.7 | $1 \times 10^{11}$ | 950 | |
| 2 | 95.0 | 5.0 | 0.5 | 8/1 | 0.5 | 18,000 | 0.8 | $1.2 \times 10^{11}$ | 950 | |
| 3 | 95.0 | 5.0 | 0.5 | 4/1 | 0.5 | 18,500 | 1.1 | $1.6 \times 10^{11}$ | 950 | |
| 4 | 95.0 | 5.0 | 0.5 | 2/1 | 0.5 | 16,500 | 1.4 | $1.2 \times 10^{11}$ | 950 | |
| 5 | 95.0 | 5.0 | 0.5 | 4/1 | 0.1 | — | — | — | 950 | Difficult to be Sintered |
| 6 | 95.0 | 5.0 | 0.5 | 4/1 | 0.25 | — | — | — | 950 | |
| 7 | 95.0 | 5.0 | 0.5 | 4/1 | 0.3125 | 19,000 | 1.2 | $4 \times 10^{11}$ | 950 | |
| 8 | 95.0 | 5.0 | 0.5 | 4/1 | 0.625 | 20,500 | 1.2 | $4 \times 10^{11}$ | 950 | |
| 9 | 95.0 | 5.0 | 0.5 | 4/1 | 1.25 | 21,400 | 1.7 | $3.5 \times 10^{11}$ | 950 | Abnormal Growth and Remarkable Reaction with setter |
| 10 | 95.0 | 5.0 | 0.5 | 4/1 | 2.50 | 21,800 | 1.2 | $4.5 \times 10^{11}$ | 950 | |
| | *95.0 | 5.0 | 0.5 | — | — | 22,000 | 1.2 | $2 \times 10^{11}$ | 1100~1150 | |

*Component to be compared.

What is claimed is:

1. High dielectric porcelain composition consisting essentially of a Pb(Mg ⅓, Nb ⅔)O₃ - PbTiO₃ - Pb(Mn ⅓, Nb ⅔)O₃ system having about 95 mol. % of Pb(Mg ⅓, Nb ⅔)O₃, about 5 mol. % of PbTiO₃, about 0.5 weight % of Pb(Mn ⅓, Nb ⅔)O₃, and having distributed therethrough, in addition, a sintering temperature lowering effective amount of PbO and ZnO,
wherein said sintering temperature lowering effective amount of said PbO and ZnO is between about 0.25–1.25% by weight of the weight of said Pb(Mg ⅓, Nb ⅔)O₃ - PbTiO₃ - Pb(Mn ⅓, Nb ⅔)O₃ system, and
wherein said sintering temperature lowering effective amount includes about 50–93% by weight of said PbO and about 7–50% by weight of said ZnO.

2. The composition of claim 1, wherein said sintering temperature lowering effective amount of said PbO and ZnO is between about 0.3–1.25% by weight of the weight of said Pb(Mg ⅓, Nb ⅔)O₃ - PbTiO₃ - Pb(Mn ⅓, Nb ⅔)O₃ system.

3. The composition of claim 2, wherein said sintering temperature lowering effective amount of said PbO and ZnO is between about 0.5–1.25% by weight of the weight of said Pb(Mg ⅓, Nb ⅔)O₃ - PbTiO₃ - Pb(Mn ⅓, Nb ⅔)O₃ system.

4. The composition of claim 1, wherein said sintering temperature lowering effective amount includes about 67–90% by weight of said PbO and about 10–33% by weight of said ZnO.

5. The composition of claim 4, wherein said sintering temperature lowering effective amount includes about 80–90% by weight of said PbO and about 10–20% by weight of said ZnO.

6. Method of reducing sintering temperature of a high dielectric porcelain composition consisting essentially of a Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system having about 95 mol. % of Pb(Mg $\frac{1}{3}$, Nb $\frac{2}{3}$)O$_3$, about 5 mol. % of PbTiO$_3$, and about 0.5 weight % of Pb(Mn $\frac{1}{3}$, Nb $\frac{2}{3}$)O$_3$, which comprises, in addition, incorporating therein a sintering temperature lowering effective amount of PbO and ZnO, wherein said sintering temperature lowering effective amount of said PbO and ZnO is between about 0.25–1.25% by weight of the weight of said Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system, and wherein said sintering temperature lowering effective amount includes about 50–93% by weight of said PbO and about 7–50% by weight of said ZnO.

7. The method of claim 6, wherein said sintering temperature lowering effective amount of said PbO and ZnO is between about 0.3–1.25% by weight of the weight of said Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system.

8. The method of claim 7, wherein said sintering temperature lowering effective amount of said PbO and ZnO is between about 0.5–1.25% by weight of the weight of said Pb(Mg $\frac{1}{3}$, Nb $\frac{2}{3}$)O$_3$ - PbTiO$_3$ - Pb(Mn $\frac{1}{3}$, Nb $\frac{2}{3}$)O$_3$ system.

9. The method of claim 6, wherein said sintering temperature lowering effective amount includes about 67–90% by weight of said PbO and about 10–33% by weight of said ZnO.

10. The method of claim 9, wherein said sintering temperature lowering effective amount includes about 80–90% by weight of said PbO and about 10–20% by weight of said ZnO.

* * * * *